United States Patent [19]
Takeoka et al.

[11] Patent Number: 5,935,480
[45] Date of Patent: Aug. 10, 1999

[54] SPECIALIZED COOKING POT INCLUDING A METALLIC AND NONMETALLIC PORTION

[75] Inventors: Nobuo Takeoka, Osaka; Yoshikazu Yamamoto, Kadoma; Norikimi Tatsumu, Izumi, all of Japan

[73] Assignee: Sharp Kabushiki Kaisha, Osaka, Japan

[21] Appl. No.: 09/001,474

[22] Filed: Dec. 31, 1997

[30] Foreign Application Priority Data

Jan. 31, 1997 [JP] Japan ..................................... 9-018617

[51] Int. Cl.⁶ ........................................................ H05B 6/78
[52] U.S. Cl. ........................... 219/752; 219/716; 219/754; 219/762; 99/348; 99/DIG. 14
[58] Field of Search ..................................... 219/725, 726, 219/732, 734, 752, 754, 762; 99/348, 451, DIG. 14

[56] References Cited

U.S. PATENT DOCUMENTS

| | | | |
|---|---|---|---|
| 4,173,925 | 11/1979 | Leon | 99/348 |
| 4,663,506 | 5/1987 | Bowen et al. | 219/734 |
| 5,280,150 | 1/1994 | Arai et al. | 219/726 |
| 5,351,606 | 10/1994 | Matsuzaki | 99/348 |
| 5,588,353 | 12/1996 | Glucksman et al. | 99/348 |

FOREIGN PATENT DOCUMENTS

| | | |
|---|---|---|
| 4-100505 | 8/1992 | Japan . |
| 4-135227 | 12/1992 | Japan . |

*Primary Examiner*—Philip H. Leung

[57] ABSTRACT

A metallic supplementary pot having superior heat conductivity is newly provided which is attached in the conventional nonmetallic specialized pot which is placed on a turn table mechanism of the microwave oven. When bread is made in the microwave oven, the supplementary pot containing material is attached in the specialized pot before cooking, and the specialized pot is attached to the drive shaft of the turn table mechanism in the oven cavity. Since the tip of the drive shaft is fit into the supplementary pot in this case, a vane member is attached to the drive shaft in the supplementary pot. When cooking is started, the vane member is turned with the rotation of the drive shaft and the material is kneaded into dough. Thereafter, the dough is heated uniformly and in a short time in the supplementary pot, and bread is completed. Since the inner circumferential surface of the supplementary pot is provided with a fluorine resin coating, the material is not adhered to the inner circumferential surface, and it can smoothly be removed from the supplementary pot. Further, easy cleaning of the supplementary pot is ensured.

8 Claims, 6 Drawing Sheets

SPECIALIZED COOKING POT INCLUDING A METALLIC AND NONMETALLIC PORTION

BACKGROUND OF THE INVENTION

1. Field of the Invention

The present invention relates to a high frequency heating apparatus which is represented by a microwave oven for domestic use. More particularly, the present invention relates to a high frequency heating apparatus which has an improved specialized cooking pot to be used in an oven cavity for cooking of various kinds.

2. Description of the Background Art

A cooking pot for a microwave oven which is used in the oven cavity is called, for example, a microwave oven pot, and it is essential for such kind of cooking as baking bread, making rice cake. The prior art of the cooking pot for a microwave oven is disclosed, for example, in Japanese Utility Model Laying-Open Nos. 4-100505 and 4-135227. These publications disclose a stirring container (cooking pot for a microwave oven) formed of heat resistant glass which is housed in the oven cavity and used with a stirring vane attached inside the container so that food material can be heated and stirred at the same time. Hereinafter, the cooking pot for a microwave oven is called a specialized pot.

Figure 4:
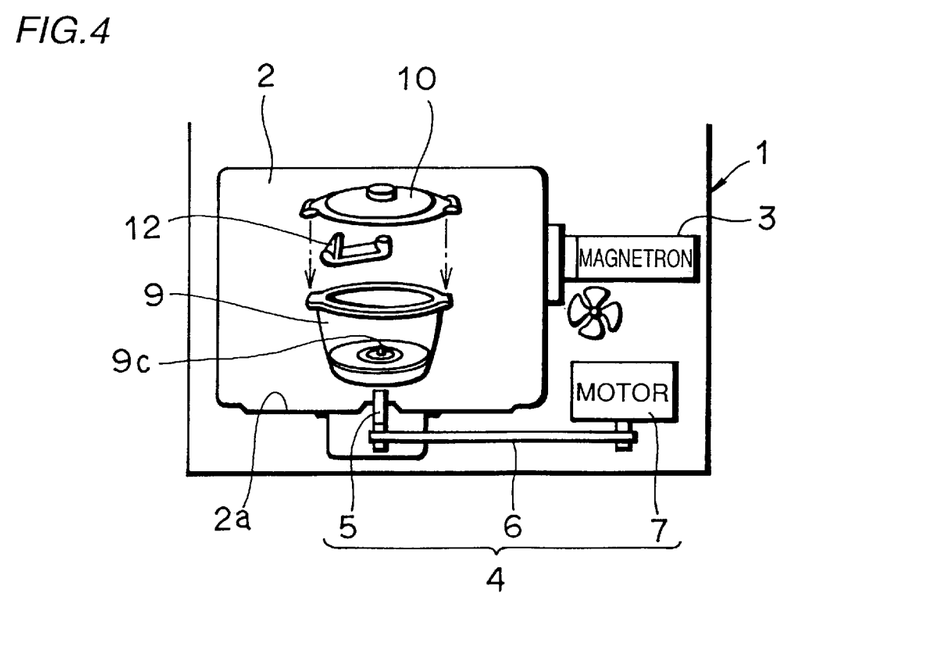
FIG. 4 schematically shows the structure of a microwave oven containing, in its oven cavity, the specialized pot applied to a conventional example and an embodiment of the present invention.
Figure 5:
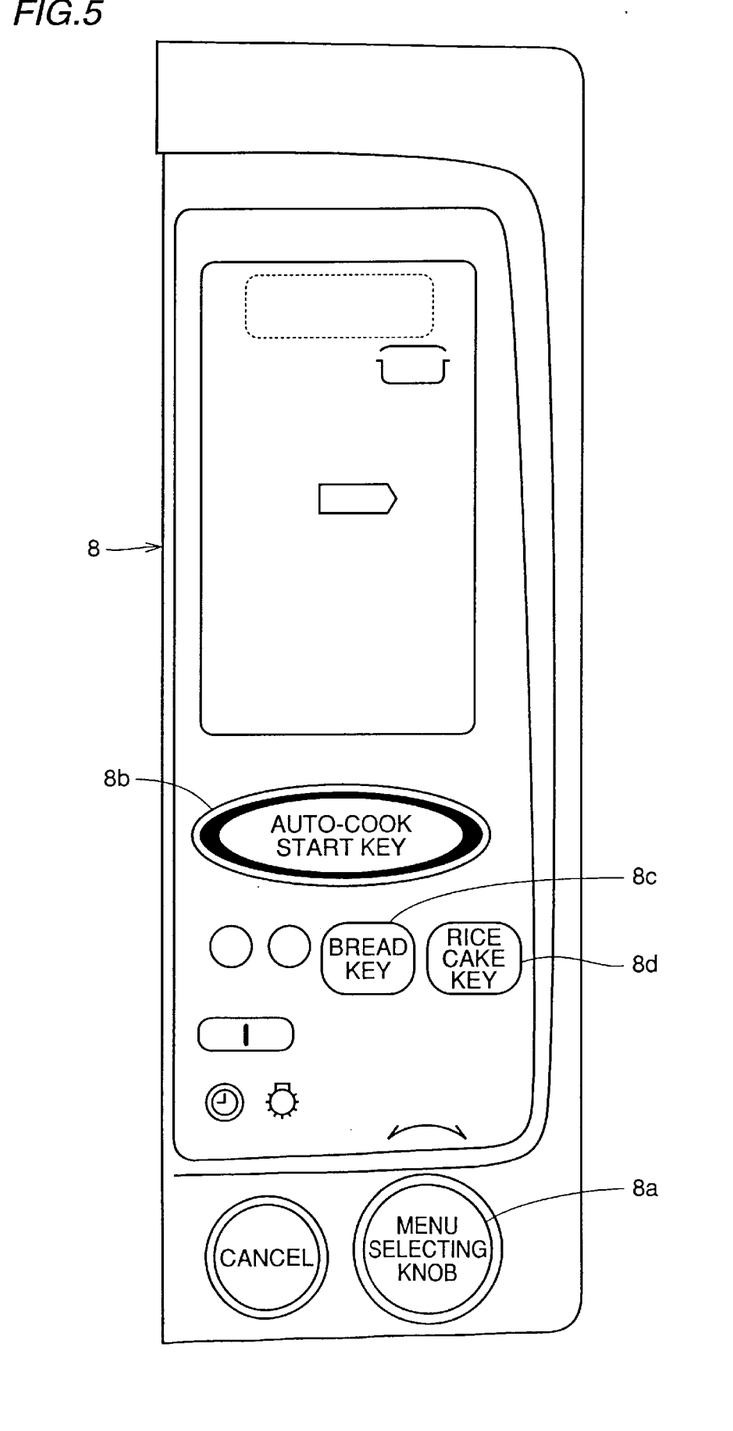
FIG. 5 shows an operation panel portion of the microwave oven applied to a conventional example and an embodiment of the present invention.

FIG. 4 schematically shows the structure of a microwave oven containing, in its oven cavity, a specialized pot applied to a conventional example and an embodiment of the present invention. FIG. 5 shows the operation panel portion of the microwave oven applied to a conventional example and an embodiment of the present invention.

In FIG. 4, the microwave oven has an apparatus body 1 which includes an oven cavity 2 for heating and cooking, having a turn table (not shown) described below, on which food or a specialized pot is placed, a magnetron 3 for irradiating the interior of oven cavity 2 with a microwave for cooking, a turn table drive mechanism 4 for rotating the above described turn table of oven cavity 2 concentrically with a drive shaft 5 during cooking, and a controller (not shown) formed of a microcomputer and so on. Magnetron 3 is attached outside the side wall of oven cavity 2. Turn table drive mechanism 4 includes a drive shaft 5 which is an output end, and a motor 7 which is connected to drive shaft 5 by a belt 6. Drive shaft 5 is arranged to be inserted into oven cavity 2 through a through hole (not shown) which was formed in the central portion of the bottom wall 2a of oven cavity 2. Further, driving of motor 7 is controlled by the control operation of the controller which corresponds to a key input through operation panel portion 8 of FIG. 5, described below.

Operation panel portion 8 of FIG. 5 is provided at the front surface of the microwave oven so as to be operable by a user, and it includes a menu selecting knob 8a for selecting a prescribed one of a plurality of menus which can be processed automatically by the microwave oven, an auto-cook start key 8b for starting automatic cooking, a bread key 8c for starting automatic cooking from making dough to baking bread, and a rice cake key 8d for starting automatic cooking from boiling rice to kneading boiled rice for making rice cake. Although operation panel portion 8 also displays various messages, time required for cooking and so on, they are not illustrated and described here.

Figure 6A:
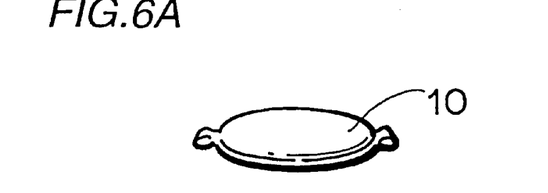
FIGS. 6A–6F are perspective views showing a specialized pot, its cover and various vane members removably attached inside the pot, applied to a conventional example and an embodiment of the present invention.

FIGS. 6A–6F are perspective views showing a specialized pot, its cover, and various vane members removably attached inside the pot, applied to a conventional example and an embodiment of the present invention. Referring to FIG. 4 and FIGS. 6A–6F, the structure of specialized pot 9 will be described. Specialized pot 9 of FIGS. 4 and 6B includes a transparent pot body 9a of heat-resistant glass, a support member 9b of heat-resistant resin fixed on the bottom of pot body 9a, and a joint mechanism portion 9c of heat-resistant resin arranged to project into pot 9 at the central portion of support member 9b. A cover 10 of heat-resistant resin shown in FIG. 6A is attached to the upper opening portion of specialized pot 9, and one of vane members 11–14 shown in FIGS. 6C–6F is selectively attached as required by processing methods to joint mechanism portion 9c for processing food.

Figure 6B:
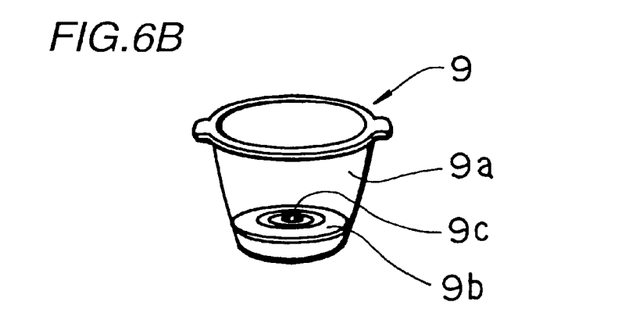
Figure 6C:
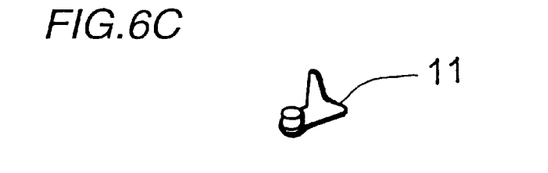
Figure 6D:
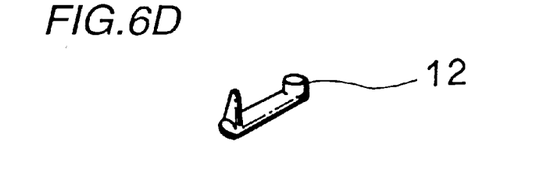
Figure 6E:
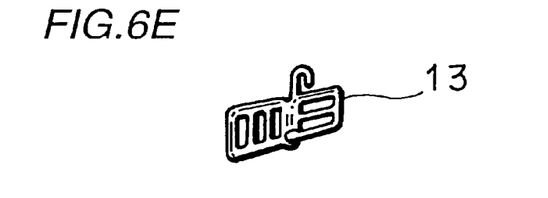
Figure 6F:
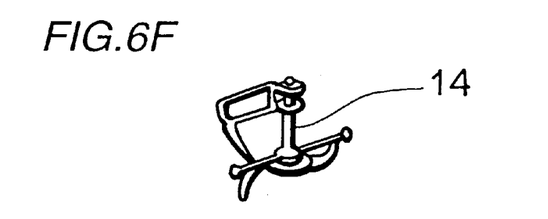

Here, pot body 9a is formed of heat-resistant glass and other parts are made of heat-resistant resin so that, when specialized pot 9 is heated by a microwave, an electric wave can be transmitted into specialized pot 9 and that the cooking progress in pot 9 can easily be observed from the outside. Since the heat-resistant glass used for pot body 9a allows transmission of an electric wave regardless of its thickness, the heat-resistant glass of pot body 9a has a thickness of approximately 10 mm to ensure the strength.

Four types of vane members 11–14 shown in FIGS. 6C–6F is selectively used according to how food material is processed. Vane members 11 to 14 are for kneading food, mixing food, preparing sponge cake and for cutting food, respectively.

These vane members 11 to 14 are selectively attached to joint mechanism portion 9c according to the cooking method and turned in specialized pot 9 as shaft 5 rotates. Therefore, various processing of food is made possible. For example, it is possible to simultaneously mix and micro-wave heat food material such as boiled rice or stew, to prepare dough, to stir and whip up raw material for sponge cake, to cut a cabbage, for example, into tiny pieces and to mash potatoes.

Figure 7:
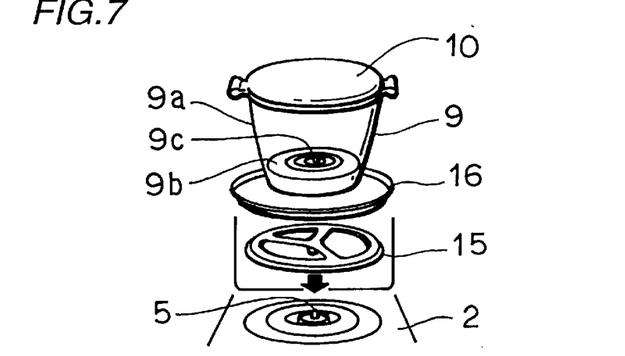
FIG. 7 shows a process of attaching the specialized pot in the cavity of the microwave oven applied to a conventional example and an embodiment of the present invention.

FIG. 7 is an illustration showing a process of attaching the specialized pot in the oven cavity of the microwave oven applied to a conventional example and an embodiment of the present invention. In the drawing, a table support 15 for placing a turn table 16 thereon is removably attached to the tip of drive shaft 5 which is provided at the bottom of oven cavity 2 and projects into oven cavity 2. Here, turn table 16 is removably attached on table support 15.

Figure 8A:
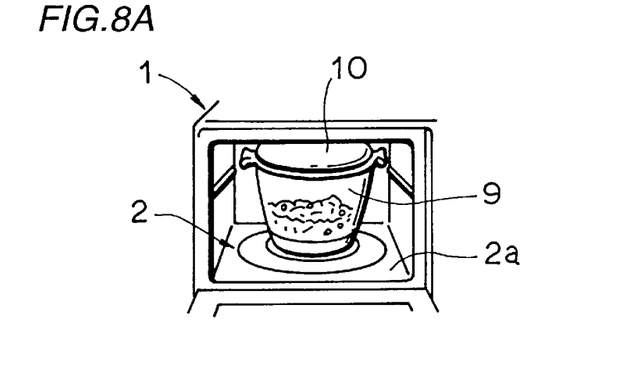
FIGS. 8A–8C show a process of boiling rice with the specialized pot applied to a conventional example and an embodiment of the present invention.
Figure 8B:
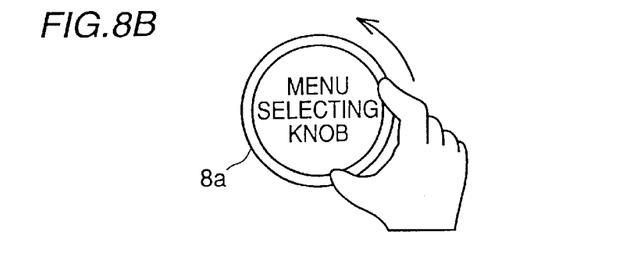
Figure 8C:
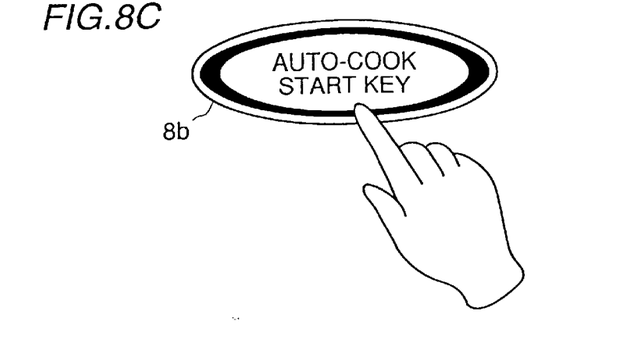

FIGS. 8A–8C are illustrations showing a process of cooking rice with the specialized pot applied to a conventional example and an embodiment of the present invention. FIGS. 9A–9E show how to use the specialized pot.

In the case of normal cooking with the microwave oven having a structure shown in FIGS. 4–7, table support 15 is attached to drive shaft 5 and turn table 16 is placed on table support 15 in advance. After food material is placed on turn table 16, a door (not shown) of the microwave oven is closed. When the keys of operation panel portion 8 are operated, magnetron 3 emits a microwave into oven cavity 2. Thus, the food material on turn table 16 is cooked. Motor 7 is also driven at this time, and its driving force is transmitted through a belt 6 to drive shaft 5 to rotate turn table 16. Since the food material on turn table 16 can be irradiated with the microwave when rotated, it is effectively heated.

How to cook rice with specialized pot 9 and cover 10 placed on turn table 16 as shown in FIG. 7 will be described with reference to FIGS. 8A–8C.

First, in FIG. 8A, specialized pot 9 containing rice and water and closed with cover 10 is placed on turn table 16 and put into oven cavity 2. Secondly, in FIG. 8B, menu selecting knob 8a of operation panel portion 8 is rotated to select rice cooking. Thirdly, in FIG. 8C, auto-cook start key 8b of operation panel portion 8 is pressed to start prescribed cooking for boiling rice.

If a conventional cooking method is employed in which food material on turn table 16 is heated in the microwave oven, various microwable containers, not limited to specialized pot 9, may be used.

Unlike other microwavable containers, specialized pot 9 is so structured as to enable a cooking method which can not be attained by such other containers. In short, when specialized pot 9 is used on its own, table support 15 and turn table 16 on drive shaft 5 are removed and joint mechanism portion 9c of specialized pot 9 is attached to directly be fit to the tip of drive shaft 5. Therefore, the tip of drive shaft 5 is inserted into specialized pot 9 through joint mechanism portion 9c. How to use specialized pot 9 in this manner will be described with reference to FIGS. 9A–9E.

Figure 9A:
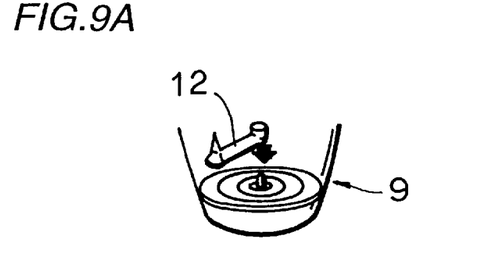
FIGS. 9A–9E show how to use the specialized pot applied to a conventional example and an embodiment of the present invention.
Figure 9B:
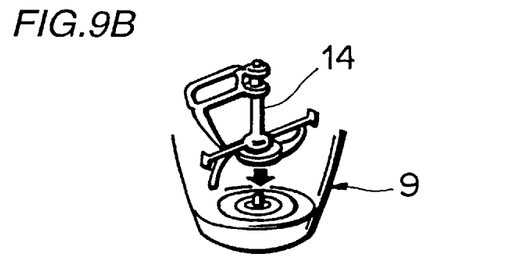

FIGS. 9A and 9B show how to attach a vane member which is appropriate for a cooking method to joint mechanism portion 9c of specialized pot 9. For example, in FIG. 9A, vane member 12 is attached to joint mechanism portion 9c to mix food material in specialized pot 9, and in FIG. 9B, vane member 14 is attached to joint mechanism portion 9c to cut food material into tiny pieces in specialized pot 9.

Figure 9C:
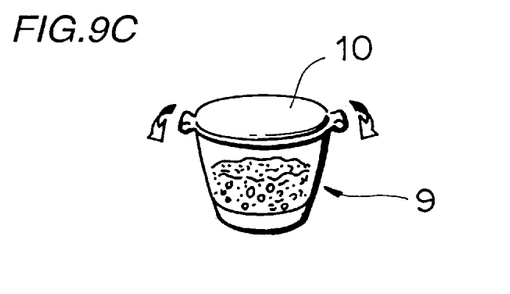
Figure 9D:
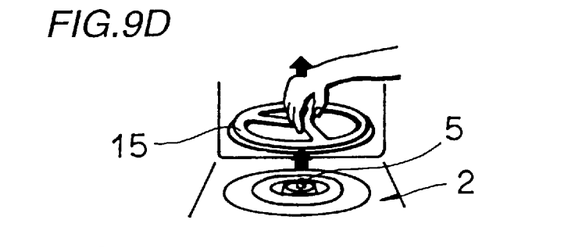
Figure 9E:
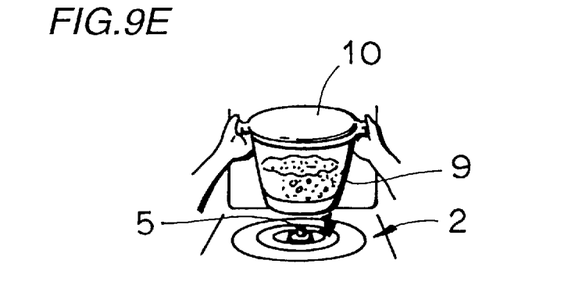

When cooking is carried out by attaching a vane member which is appropriate for a cooking method to joint mechanism portion 9c of specialized pot 9, food material is contained in specialized pot 9 and pot 9 is tightly closed with cover 10 in FIG. 9C. Then, in FIG. 9D, table support 15 or the like which is attached to drive shaft 5 projecting in oven cavity 2 is removed, if there is any. In FIG. 9E, joint mechanism portion 9c of specialized pot 9 in the state of FIG. 9C is fit to the tip of drive shaft 5 in order to attach specialized pot 9 to shaft 5. Thereafter, as described above, when operation panel portion causes 8 selection of a menu and start of cooking, motor 7 is activated. Accordingly, drive shaft 5 and joint mechanism portion 9c which is fit to shaft 5 are rotated, and the vane member which is attached to joint mechanism portion 9c turns concentrically with drive shaft 5. As a result, the food material is kneaded, mixed or cut while interfering with the vane member.

In baking bread, dough can be prepared by using conventional specialized pot 9 described above and operating, for example, bread key 8c. However, the succeeding process, that is, baking the dough could not be achieved in specialized pot 9. In short, if dough is prepared in specialized pot 9 and thereafter the dough is baked in oven cavity 2 as it is, the completed bread may have a uniformly baked color and a burn, or the bread may not be removed from the inner wall of specialized pot body 9a. Further, the time required for baking is undesirably longer.

These problems arise because pot body 9a of specialized pot 9 which contains the dough is formed of glass having poor heat conductivity. In short, pot body 9a which is formed of glass can not ensure a uniform temperature for the entire pot 9 during heating. Conventionally, when dough was prepared in specialized pot 9, the dough was once removed from specialized pot 9 and moved into another container, and the container was put into oven cavity 2. There was a need for cooking by a heater for baking bread.

When rice cake is prepared in specialized pot 9 by operating rice cake key 8d, glutinous rice which is immersed in water in specialized pot 9 is heated and the heated glutinous rice is kneaded by a vane member. Since the rice adheres to the inner wall of glass-made pot body 9a when it is kneaded, the kneaded rice could not conveniently be removed from specialized pot 9 thereafter. This is due to the adhesive nature of rice cake.

SUMMARY OF THE INVENTION

An object of the present invention is to provide a high frequency heating apparatus which has a cooking pot having superior heat conductivity.

Another object of the present invention is to provide a high frequency heating apparatus which has a cooking pot having superior heat conductivity and an inner wall surface to which food material does not adhere.

In order to achieve the above described objects, the high frequency heating apparatus according to the present invention includes an oven cavity which has a shaft provided at the bottom surface and rotated during cooking and a table mechanism removably attached to the shaft and turned with the rotation of the shaft, a nonmetallic pot removably attached to the shaft in the oven cavity, a metallic pot removably attached in the nonmetallic pot, and a vane member.

The nonmetallic pot has a fitting member which fits to the shaft so that the tip of the shaft is inserted inside the pot, and the pot is removably attached to the shaft through the fitting member instead of the table mechanism. The metallic pot is attached through the fitting member to the nonmetallic pot which is attached to the shaft so that the tip of the shaft is inserted inside the pot. When the nonmetallic or metallic pot is to be attached, the vane member is removably attached to the tip of the shaft through the fitting member.

Therefore, when the bread is prepared, material in the metallic pot is kneaded into dough by a vane member which is turned with the rotation of the shaft, and the dough is baked uniformly and in a short time because of superior heat conductivity of metallic pot. Therefore, making dough to baking bread can be carried out successively in one pot without the need to transfer the dough to another container. Since the dough is baked in the metallic pot, the baked color of bread is uniform and the time required for baking is substantially shortened.

When the metallic pot is used to be attached inside the nonmetallic pot, the both pots are attached to the shaft through the fitting member so as to share the rotating shaft in the oven cavity, and they also share a vane member attached to the shaft. Therefore, even if the metallic pot is added, increase in the number of parts in the high frequency heating apparatus can be suppressed.

The above described metallic pot may be so formed that its outer circumferential surface comes to be in contact with the inner circumferential surface of the nonmetallic pot when the metallic pot is attached in the nonmetallic pot. Thus, the volume of the metallic pot can be maximized, and food material can be prevented from jamming between the metallic and nonmetallic pots.

The above described metallic pot is formed of aluminum which is a metal having high heat conductivity. Therefore, food material in the metallic pot is uniformly heated and cooked in a short time.

The inner circumferential surface of the above described metallic pot may be provided with a fluorine resin coating. It can prevent adhesion of food material to the inner circumferential surface when the food material is processed by the vane member which is turned with the rotation of the shaft during cooking, and also prevent adhesion of food material to the inner circumferential surface when the food material is removed from the pot at the end of cooking. Further, it allows easy cleaning of the inner circumferential surface of the metallic pot.

A protrusion may be formed at one or more portions of the inner circumferential surface of the metallic pot. Thus, food material can be kneaded at various angles during cooking by a turning vane. It can improve the finish and fermentation of dough as well as the taste of bread.

When the above described metallic pot is attached in the nonmetallic pot, the height of the metallic pot may be larger than that of the nonmetallic pot. Thus, the metallic pot is directly irradiated with a heat ray and the entire pot is heated uniformly in a short time.

The upper opening portion of the above described metallic pot shares the cover with the nonmetallic pot. Thus, even if the metallic pot is used in the high frequency heating apparatus, the cover is shared by the metallic and nonmetallic pots, and increase in the number of parts can be suppressed.

The outer circumferential surface of the metallic pot may be provided with an oxide coating. Therefore, oxidation is prevented even if the metallic pot is used.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described in detail below with reference to the drawings.

Figure 1A:
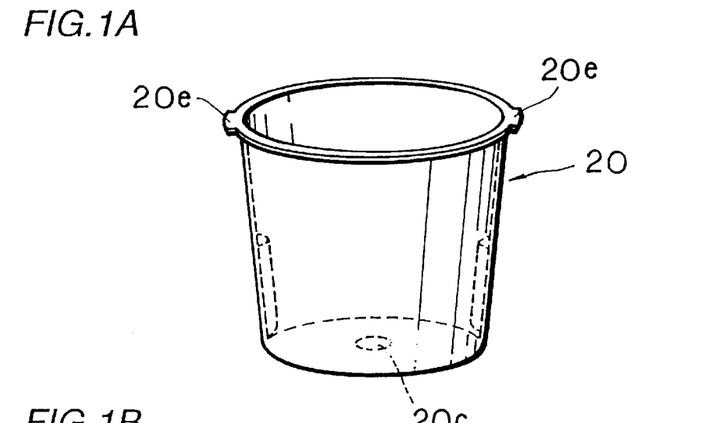
FIGS. 1A and 1B show the structure of a supplementary pot used with a specialized pot of a microwave oven according to an embodiment of the present invention.
Figure 1B:
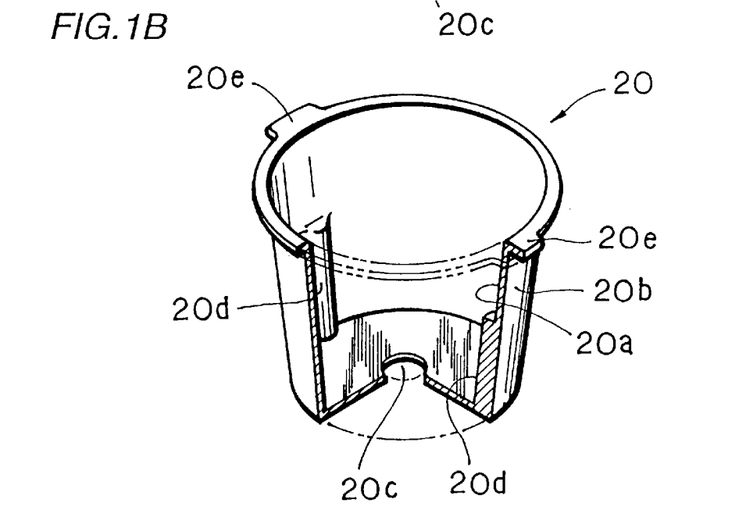
Figure 2:
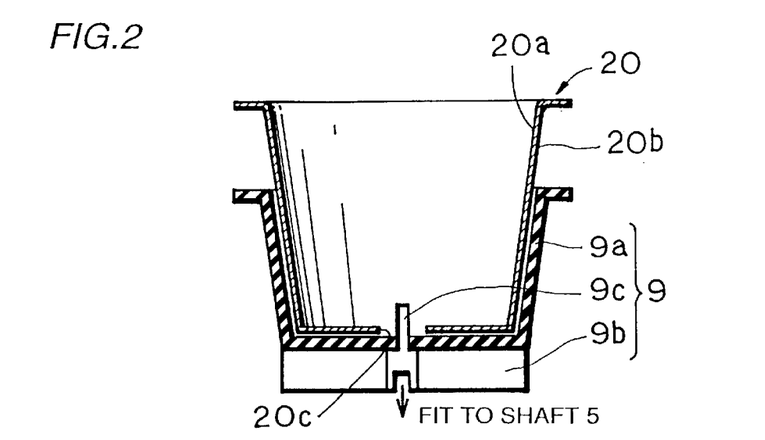
FIG. 2 is a cross sectional view when the supplementary pot of FIG. 1 is attached to the specialized pot.
Figure 3:
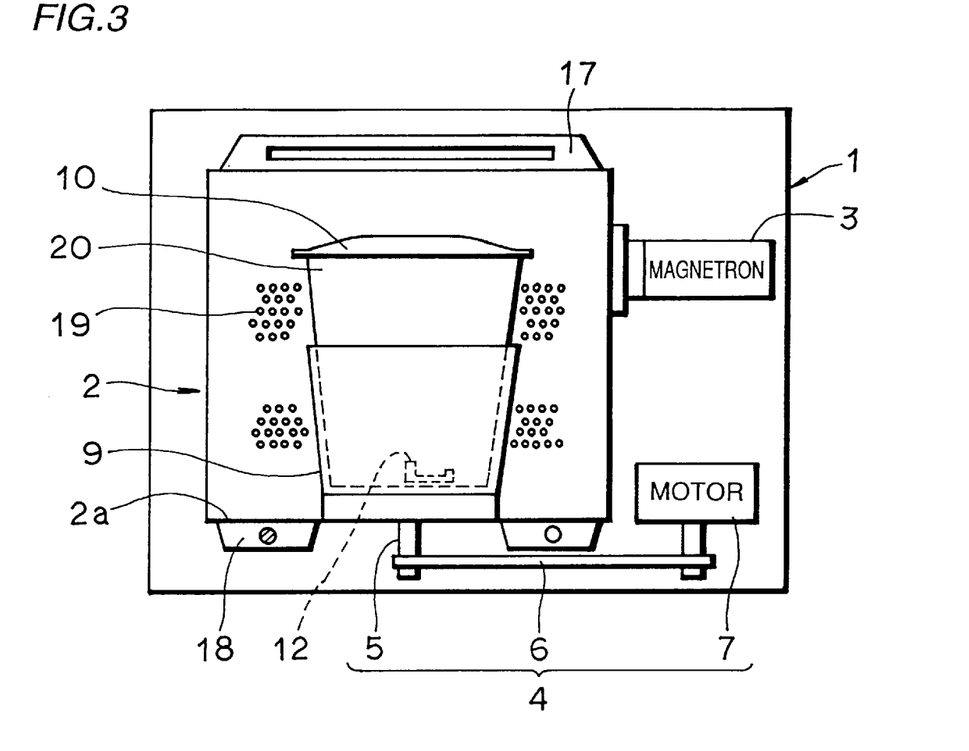
FIG. 3 shows the inner portion of an oven cavity when cooking is carried out in the microwave oven by using the specialized pot and the supplementary pot attached to the specialized pot as shown in FIG. 2.

FIGS. 1A and 1B show the structure of a supplementary pot which is used, in a supplemental manner, with a specialized pot of a microwave oven according to an embodiment of the present invention. FIG. 2 is a cross sectional view when the supplementary pot of FIG. 1 is attached to the specialized pot. FIG. 3 shows the inner portion of an oven cavity when cooking is carried out in the microwave oven by using the specialized pot and the supplementary pot attached to it as shown in FIG. 2. In the drawings, the parts having the same structure and function as the conventional art described above have the same reference numerals, and their description will not be repeated.

The microwave oven of FIG. 3 is the same as the conventional one described above in that it includes, in an oven cavity 2, a nonmetallic specialized pot 9 which is detachably attached to a drive shaft 5 of a turn table drive mechanism 4. In FIG. 3, the microwave oven includes, to heat food in oven cavity 2, an upper heater 17 provided at the upper wall surface of oven cavity 2 to emit a heat ray in the cavity, a lower heater 18 provided on the lower surface side of the bottom surface 2a of oven cavity 2 to emit a heat ray in the cavity, and a heater (not shown) provided on the back surface side of oven cavity 2 to emit a heat ray in the cavity. A plurality of punching holes 19 are formed in the side wall surface of oven cavity 2, and the heat ray from the heater which is arranged at the back surface portion of oven cavity 2 is emitted through the plurality of punching holes 19 to oven cavity 2.

In order to prepare bread from making dough to baking bread in one pot while allowing uniform baking, as well as to prepare rice cake from heating glutinous rice to kneading the heated glutinous rice in one pot without adhesion of the rice to the inner wall surface, a metallic supplementary pot 20 which is detachably attached in specialized pot 9 is employed in the present embodiment. Supplementary pot 20 may be formed of any metal having superior heat conductivity, and it is formed of aluminum in this embodiment.

FIG. 1a shows supplementary pot 20 from outside, and FIG. 1B is a partly cutaway view of supplementary pot 20 to show the inner part of supplementary pot 20. In FIGS. 1A and 1B, the entire inner circumferential surface 20a of supplementary pot 20 is provided with a fluorine resin coating, and its outer circumferential surface 20b is entirely provided with an anodic oxide coating to prevent metal oxidation.

In the bottom wall central portion of supplementary pot 20, a through hole 20c is formed through which a joint mechanism portion 9c of specialized pot 9 is inserted when supplementary pot 20 is housed to be fit in specialized pot 9 as shown in FIG. 2. Further, a protrusion 20d is provided at one or more portions, at two portions in this case, of inner circumferential surface 20a of supplementary pot 20. Specifically, at the two portions which are opposed to each other at inner circumferential surface 20a of supplementary pot 20, semicylindrical protrusion 20d is formed extending from the bottom wall to the middle of inner circumferential surface 20a.

Further, supplementary pot 20 is used for cooking, fit and housed in specialized pot 9 as shown in FIG. 2. Therefore, the height of supplementary pot 20 is set to be larger than that of specialized pot 9 so that the heat rays from upper heater 17, lower heater 18 and the heater provided at the back surface portion of oven cavity 2 are directly directed to supplementary pot 20 in order to heat supplementary pot 20 efficiently and entirely. Therefore, supplementary pot 20 is housed in specialized pot 9 to project from the upper opening portion of specialized pot 9. In order to ensure that cover 10 is shared by specialized pot 9 and supplementary pot 20, a flange 20e for attaching cover 10 to supplementary pot 20 is provided at two portions which are opposed to each other at the upper opening periphery of supplementary pot 20.

In order to prevent food material from jamming into a gap between supplementary pot 20 and pot body 9a when the pots are arranged as shown in FIG. 2, and to enlarge the volume of supplementary pot 20, the outer circumferential surface of supplementary pot 20 may have a shape and size which almost correspond to the inner circumferential surface of pot body 9a, so that supplementary pot 20 can be in specialized pot 9 to be almost in tight contact with the inner circumferential surface of pot body 9a. Further, supplementary pot 20 may be of a shape and size to be housed in specialized pot 9 with a gap between the pot 20 and pot body 9a therebetween.

It is assumed here that bread is baked in the microwave oven by using supplementary pot 20. First, supplementary pot 20 is fit in specialized pot 9 as shown in FIG. 2. In this case, the bottom wall of supplementary pot 2 is in contact with the bottom wall inner surface of specialized pot 9 and the upper portion from the middle projects from specialized pot 9 to improve heat conductivity to the entire supplementary pot 20. From through hole 20c of supplementary pot 20, joint mechanism portion 9c is inserted into supplementary pot 20. Even if the height of supplementary pot 20 is the same as that of specialized pot 9, it does not affect the heat conductivity to the entire supplementary pot 20.

Then, a vane member 14 (see FIG. 6F) for making dough is attached to joint mechanism portion 9c of specialized pot 9, which projects into pot 20 from through hole 20c of supplementary pot 20. Thereafter, materials which are necessary for bread, for example, flour, water, yeast and so on are put into supplementary pot 20, and pot 20 is tightly closed with cover 10. As shown in FIG. 3, specialized pot 9 which receives supplementary pot 20 is attached through joint mechanism portion 9c to drive shaft 5 in oven cavity 2.

At this time, joint mechanism portion 9c is fit to the tip of drive shaft 5. Therefore, when joint mechanism portion 9c is fit to the tip of drive shaft 5, the tip of drive shaft 5 is inserted into pot 9 or 20 through joint mechanism portion 9c as shown in FIG. 2.

When bread key 8c of operation panel portion 8 is pressed, motor 7 is driven to rotate drive shaft 5. With the rotation of shaft 5, vane member 14 which is attached to joint mechanism portion 9c is turned. As a result, the materials in supplementary pot 20 are kneaded by turning vane member 14, and the dough is completed.

When vane member 14 turns to knead the dough in supplementary pot 20, the dough is kneaded uniformly at various angles because the dough repeatedly interferes with protrusions 20d provided at supplementary pot 20. When there is no protrusion 20d, the dough only goes around smoothly along inner circumferential surface 20a of supplementary pot 20, and it can not be kneaded sufficiently. By providing one or more protrusions 20d at inner circumferential surface 20a of supplementary pot 20, the angle at which dough is kneaded can be varied. If protrusions 20d are formed at positions which are opposed to each other at inner circumferential surface 20a, the angle at which dough is kneaded varies more frequently and it enables uniform kneading.

After the completion of the kneading process, the fermentation process is started. In the fermentation process, power is supplied to upper and lower heaters 17 and 18, and heaters 17 and 18 are controlled according to a preset operation of a control portion so that oven cavity 2 maintains a prescribed temperature (45° C.) for fermentation.

After the dough is expanded in the fermentation process, the baking process is started. In this case, the dough may be heated and baked to 180° C. by upper and lower heaters 17 and 18, or baked by irradiating oven cavity 2 through a plurality of punching holes 19 with the heat ray from the heater provided at the back surface portion of oven cavity 2. Since bread is prepared in metallic supplementary pot 20 in this way, superior heat conductivity to the dough and uniform baking of bread are achieved. When the baked bread is removed from pot 20, it can smoothly be removed without adhesion to inner circumferential surface 20a because a fluorine resin coating is provided at inner circumferential surface 20a of pot 20.

Considering that the volume of baked bread is larger than that of dough, it is desirable that supplementary pot 20 has a shape tightly fitting to specialized pot 9 with increased height to ensure sufficient volume.

Then, making rice cake in supplementary pot 20 will be described. First, supplementary pot 20 is fit into specialized pot 9 as shown in FIG. 2. Then, a vane member 11 for kneading rice is attached to joint mechanism portion 9c which projects from through hole 20c of supplementary pot 20.

After glutinous rice and water are put into supplementary pot 20 and the upper opening portion of supplementary pot 20 is tightly closed with cover 10, specialized pot 9 receiving supplementary pot 20 is put into oven cavity 2 as shown in FIG. 3, and specialized pot 9 is attached to drive shaft 5 through joint mechanism portion 9c. Thus, the tip of drive shaft 5 is inserted into supplementary pot 20 through joint mechanism portion 9c.

And then, rice cake key 8d of operation panel portion 8 is pressed, and the rice in supplementary pot 20 is boiled by upper heater 17, lower heater 18, or the heater provided at the back surface portion of open cavity 2 boils. When the boiled rice is ready, motor 7 is driven to rotate drive shaft 5, and the rotation of shaft 5 is transmitted through joint mechanism portion 9c to vane member 11. Vane member 11 turns concentrically with joint mechanism portion 9c (drive shaft 5). As a result, the boiled rice in pot 20 is kneaded into rice cake by vane member 11.

Since inner circumferential surface 20a of supplementary pot 20 is provided with a fluorine resin coating, the rice is kneaded in a satisfactory matter without adhesion to inner circumferential surface 20a. When the rice cake is removed from supplementary pot 20 after the end of the kneading process, it can easily be removed from pot 20 without adhesion to inner circumferential surface 20a. Since food material for rice cake or the like is not adhered to inner circumferential surface 20a, supplementary pot 20 can easily be cleaned after cooking.

As is conventional, specialized pot 9 can separately be employed without supplementary pot 20 in the microwave oven according to the present embodiment. When supplementary pot 20 is used in the microwave oven, heating by a microwave should be avoided because supplementary pot 20 is made of metal.

As described above, supplementary pot 20 and specialized pot 9 share cover 10, support member 9b, joint mechanism portion 9c, various vane members and so on. Therefore, the number of parts to be used is limited even if supplementary pot 20 can be used in the microwave oven.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A high frequency heating apparatus, comprising:

an oven cavity having a shaft provided at a bottom surface and rotated during cooking and a table mechanism detachably attached to said shaft and turned with a rotation of said shaft;

means for rotating the shaft;

means for supplying high frequency energy to the high frequency apparatus;

a nonmetallic pot having a fitting member fit to said shaft so as to receive a tip of said shaft inserted therein and removably attached to said shaft through said fitting member in place of said table mechanism in said oven cavity;

a metallic pot removably attached into said nonmetallic pot so as to receive the tip of said shaft inserted therein through said fitting member; and a vane member removably attached to the tip of said shaft through said fitting member when said nonmetallic pot or said metallic pot is to be attached;

wherein an outer circumferential surface of said metallic pot comes into contact with an inner circumferential surface of said nonmetallic pot when said metallic pot is inserted into said nonmetallic pot.

2. The high frequency heating apparatus according to claim 1, wherein said metallic pot is made of a metal having high heat conductivity.

3. The high frequency heating apparatus according to claim 2, wherein the metal having said high heat conductivity is aluminum.

4. The high frequency heating apparatus according to claim 3, wherein an inner circumferential surface of said metallic pot is provided with a fluorine resin coating.

5. The high frequency heating apparatus according to claim 4, wherein a protrusion is formed at one or more portions of the inner circumferential surface of said metallic pot.

6. The high frequency heating apparatus according to claim 1, wherein said metallic pot is larger in height than said nonmetallic pot when said metallic pot is attached into said nonmetallic pot.

7. The high frequency heating apparatus according to claim 1, wherein an upper opening portion of said metallic pot is so shaped as to share a cover by said metallic pot and said nonmetallic pot.

8. The high frequency heating apparatus according to claim 1, wherein an outer circumferential surface of said metallic pot is provided with an oxide coating.

* * * * *